UNITED STATES PATENT OFFICE.

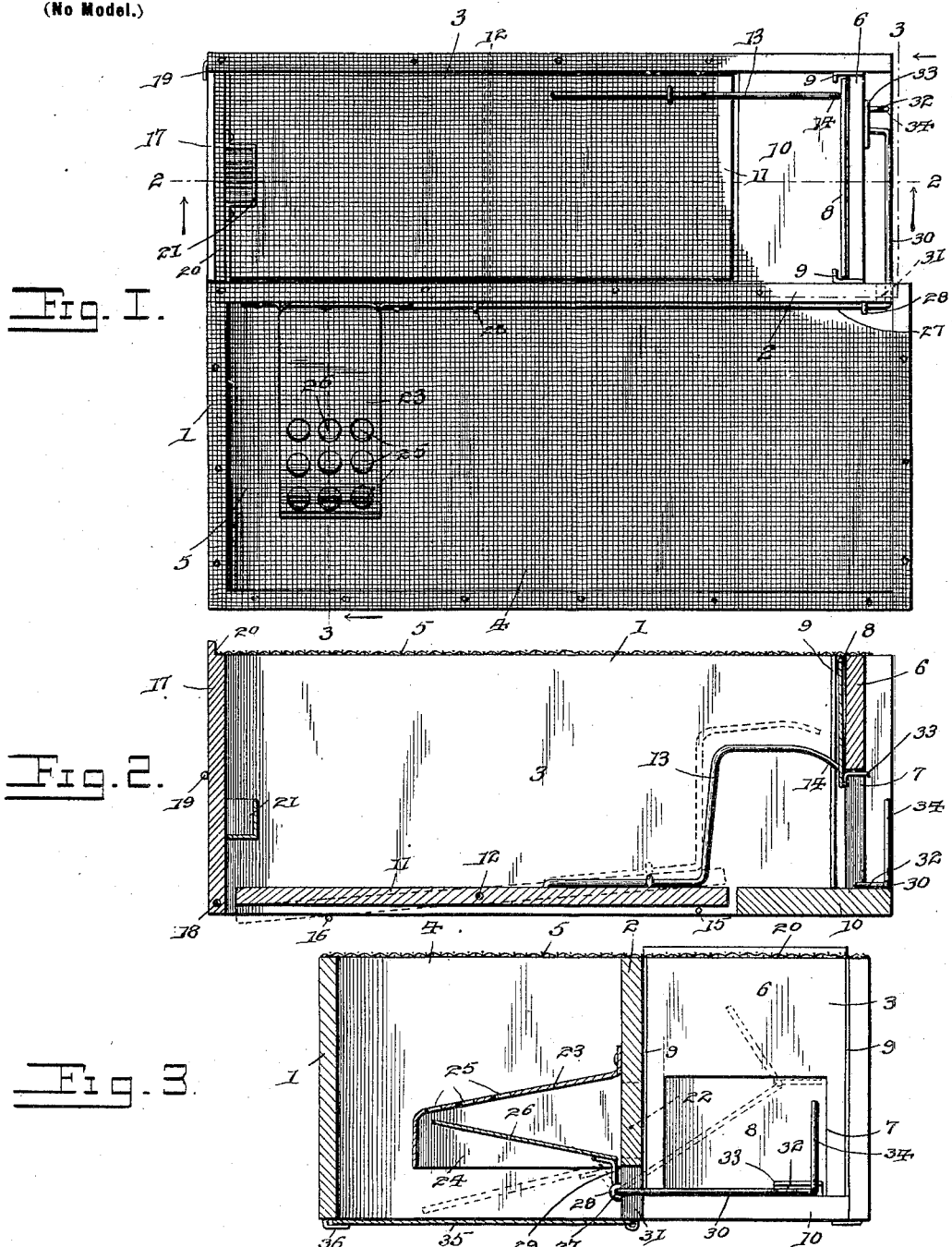

GRANDVILLE FRANKLIN JONES, OF EXETER, NEBRASKA.

ANIMAL-TRAP.

SPECIFICATION forming part of Letters Patent No. 662,624, dated November 27, 1900.

Application filed January 26, 1900. Serial No. 2,899. (No model.)

*To all whom it may concern:*

Be it known that I, GRANDVILLE FRANKLIN JONES, a citizen of the United States, residing at Exeter, in the county of Fillmore and State of Nebraska, have invented a new and useful Animal-Trap, of which the following is a specification.

This invention relates to animal-traps, and has for one object to provide an improved device of this character having means whereby the animal resets the trap and at the same time cuts off all avenues of escape. It is also designed to provide improved means for holding open the entrance-door, to provide for the convenient setting of the trap from the exterior thereof, and finally to arrange for conveniently baiting the trap and removing the animal therefrom.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a top plan view of a trap constructed in accordance with the present invention and having a portion of the top broken away to more fully illustrate the interior thereof. Fig. 2 is a longitudinal sectional view taken on the line 2 2 of Fig. 1. Fig. 3 is a transverse sectional view taken on the irregular line 3 3 of Fig. 1.

Corresponding parts in the several figures of the drawings are designated by like characters of reference.

Referring to the accompanying drawings, it will be seen that the present trap comprises a substantially rectangular frame 1, which is divided by a longitudinal partition 2 into an entrance-compartment 3 and a confinement-compartment 4, the upper sides of both compartments being covered by means of a wire screen 5, so that the interior of the trap may be conveniently viewed. The end 6 of the entrance-opening is located inwardly from the adjacent end of the frame and is provided with an entrance-opening 7, through which it is designed to have the animal pass. This entrance-opening is controlled by means of a vertically-slidable trap-door 8, the opposite edges of which are confined and guided by means of substantially L-shaped guide-plates 9, which extend inwardly from the end piece 6. Extending a suitable distance inwardly beyond the door 8 is a fixed platform 10, and beyond the latter is a tilting platform 11, which is pivotally mounted intermediate of its ends upon a transverse pin or rod 12, which has its opposite ends fitted to the partition 2 and the opposite side of the confinement-compartment. This tilting platform is designed to drop the door 8 and is provided with a substantially L-shaped trip-rod 13, secured to the forward end of the platform, and has its forward free end 14 bent or bowed downwardly, so as to form a catch which is in frictional engagement with the inner side of the door, so as to hold the latter in its elevated position, as indicated in Fig. 2 of the drawings. By reference to Fig. 1 it will be seen that this trip-rod 13 is located adjacent to the outer side of the compartment, so as not to interfere with the entrance of the animal. To hold the forward end of the tilting platform in a substantially horizontal position, there is provided a stop-pin or shoulder 15, extending inwardly from the side of the trap and normally in engagement with the under side of the platform, whereby the weight of the animal may not displace said platform. The opposite rear end of the platform is free to move in a vertical direction; but the downward movement thereof is limited by means of a suitable stop 16, carried by the frame and located at a predetermined distance below the platform, so as to permit of the required movement thereof to disengage the trip-rod from the door. As shown in Fig. 2 of the drawings, the tilting platform is elevated above the lower edge of the frame of the trap, so as to provide for the tilting movement of the platform.

The rear end of the entrance-compartment is closed by means of a door 17, hinged at its lower end, preferably by means of a transverse pin 18, which is supported by the partition 2 and the opposite side of the entrance-compartment. This door is held in a normally-closed position by means of a suitable pivoted catch 19, carried by the frame of the trap. At the upper inner edge of the door there is provided a rabbet 20 to receive the screen-cover 5. A suitable bait-box 21 is secured to the inner side of this door, so as to be conveniently accessible for placing the bait therein by swinging the door outwardly.

Communication is had between the entrance-compartment and the confinement-compartment by means of an opening or passage 22, formed through the partition 2 and located adjacent to the rear end of the trap. Located within the confinement-compartment is a hood or shield 23, secured to the partition 2 and located immediately above the passage or opening 22 and having a pendent marginal flange 24, extending to the bottom of said opening, so as to partially close the latter and permit access thereto from the lower side only. In the top of the shield 23 there are provided openings or perforations 25 to admit light within the shield for a purpose as will be hereinafter described. The lower open side of the shield or hood is normally closed by means of a tilting door 26, which is carried by a rock-shaft 27, extending longitudinally of the confinement-compartment and mounted upon the partition 2 by means of eyes or other suitable devices 28. As best illustrated in Fig. 3, it will be seen that the door 26 is connected to the rock-shaft by means of a lateral arm 29, carried by the adjacent end of the rock-shaft. At the opposite outer end of the rock-shaft there is provided a horizontal arm 30, extending in a direction opposite to that of the arm 29 and projecting through a vertically-disposed slot 31, formed through the partition 2, so that said arm may extend transversely across the lower end of the entrance-opening 7. The free end of this arm is bent inwardly, so as to form a foot 32, which normally rests upon the fixed platform 10 and projects into the entrance-opening 7 and beneath an outwardly-projecting shoulder 23, carried by the lower edge of the door 8. The extremity of the arm 30 is extended upwardly upon the outer side of the end piece 6, so as to form a handle 34 for operating the arm exteriorly of the trap.

To set the trap, the arm 30 is elevated, whereby the foot 32 engages the shoulder 33 and also elevates the door, the latter being held in its elevated position by reason of the frictional engagement with the trip-rod 13. It will be understood that the arm 30 is heavier than the door 26 at the opposite end of the rock-shaft and that said arm automatically resumes its normal position, so that communication between the two compartments is normally cut off by the door 26, as fully illustrated in Fig. 3 of the drawings. When the animal has entered the trap and approached the bait-box 21, his weight will tilt downwardly the rear end of the platform, thereby elevating the forward end thereof and disengaging the trip-rod 13 from the door 8, as indicated by dotted lines in Fig. 2 of the drawings, thus releasing the door, which falls by gravity to close the entrance-opening 7, and thereby cut off the escape of the animal. The animal will naturally seek to escape through the opening or passage 22 in the partition 2 on account of the light which passes through the perforation 25 in the hood 23, and the door 26 will be tilted downwardly by the weight of the animal, and thereby deposit the latter within the confinement-compartment, after which the door resumes its normal position by reason of the weight of the arm 30, as hereinbefore set forth, so as to cut off access to the entrance-compartment. It will now be noted that as the door 26 moves downwardly by the weight of the animal the arm 30 will be automatically thrown upwardly, so as to open and reset the door 8 without necessitating the attention of an attendant.

In order that the animal may be conveniently removed from the confinement-compartment, the latter is provided with a hinged bottom 35, which is normally closed by means of one or more catches 36, pivoted to the lower edge of the trap and normally engaging the exterior of the bottom 35.

What is claimed is—

1. An animal-trap, comprising an entrance-compartment, and a confinement-compartment, a vertically-slidable door for the entrance-compartment, a vertically-tilting door for controlling the communication between the two compartments, a rock-shaft extending between the doors, and provided with oppositely-extending arms operatively connected to the respective doors, one of the arms being provided with a lateral foot for detachable engagement with the under side of a shoulder carried at the lower edge of the door.

2. An animal-trap, having an entrance-door, a tilting platform, a trip device between the platform and the door, another outwardly-swinging door located in one side of the trap, and a bait-holder carried by the door, the latter and the bait-holder being located adjacent to one end of the platform.

3. An animal-trap, having an entrance-door, means for tripping the latter, a second outwardly-swinging door located in one side of the trap, and a bait-holder carried by the latter door.

4. An animal-trap, having a vertically-movable door, a vertically-tilting platform, a trip device carried by the forward and upwardly tilting end of the platform, and having a supporting engagement with the door, a second outwardly-swinging door located at the opposite rear end of the platform and in one side of the trap, and a bait-holder carried by the inner side of the latter door and located above the platform.

5. An animal-trap, comprising an entrance-compartment, and a confinement-compartment, a vertically-slidable door for the entrance-compartment, and having a lateral shoulder at its lower edge, a vertically-tilting platform located within the entrance-compartment, a trip-rod carried by the forward end of the platform and in engagement with the door, a second door located at the opposite end of the entrance-compartment, a bait-holder carried by the latter door, a passage communicating between the two compartments, a hood or shield located within the confinement-compartment and partly inclosing the passage, a tilting door operating within the hood or shield, a rock-shaft extending between the tilting door and the slidable door, oppositely-extending arms carried by the rock-shaft and operatively connected to the respective tilting and slidable doors, and a lateral foot carried by one of the arms and engaging the under side of the shoulder on the sliding door.

In testimony that I claim the foregoing as my own I have hereto affixed my signature in the presence of two witnesses.

GRANDVILLE FRANKLIN JONES.

Witnesses:
 IDA SKINNER,
 ELULA SMITH.